United States Patent [19]

Selberg

[11] Patent Number: 5,682,732
[45] Date of Patent: Nov. 4, 1997

[54] SEALING JAW CONSTRUCTED FROM TWO CERAMIC MATERIALS OF WHICH ONE IS ELECTRICALLY CONDUCTIVE

[75] Inventor: Hans Selberg, Lund, Sweden

[73] Assignee: Tetra Laval Holdings & Finance S.A., Pully, Switzerland

[21] Appl. No.: 513,813
[22] PCT Filed: Feb. 25, 1994
[86] PCT No.: PCT/IB94/00025
  § 371 Date: Oct. 13, 1995
  § 102(e) Date: Oct. 13, 1995
[87] PCT Pub. No.: WO94/20284
  PCT Pub. Date: Sep. 15, 1994

[30] Foreign Application Priority Data

Mar. 2, 1993 [SE] Sweden .................. 9300693

[51] Int. Cl.$^6$ .................................. B65B 51/10
[52] U.S. Cl. .................. 53/477; 53/371.2; 53/374.2; 53/375.9
[58] Field of Search ................ 53/371.2, 374.2, 53/374.6, 375.9, 375.3, 477; 219/243, 221, 544, 542, 553, 552, 505

[56] References Cited

U.S. PATENT DOCUMENTS

| | | | |
|---|---|---|---|
| 4,075,818 | 2/1978 | Wright et al. | 53/374.2 |
| 4,292,118 | 9/1981 | Wyslotsky | 53/375.3 |
| 4,358,669 | 11/1982 | Bryson, Jr. | 219/542 |
| 4,523,935 | 6/1985 | Takagi et al. | 219/544 |
| 4,544,828 | 10/1985 | Shigenobu et al. | 219/543 |
| 4,923,556 | 5/1990 | Kettelhoit et al. | 211/243 |
| 5,086,210 | 2/1992 | Nunogaki et al. | 219/553 |
| 5,196,678 | 3/1993 | Doerner | 219/542 |
| 5,225,662 | 7/1993 | Schmidt | 219/544 |
| 5,233,166 | 8/1993 | Maeda et al. | 219/544 |
| 5,278,939 | 1/1994 | Boes et al. | 219/542 |
| 5,321,930 | 6/1994 | Poole | 53/374.2 |
| 5,352,321 | 10/1994 | Held | 219/243 |
| 5,389,184 | 2/1995 | Jacaruso et al. | 219/544 |

FOREIGN PATENT DOCUMENTS

| | | |
|---|---|---|
| 2607749 | 12/1986 | France . |
| 1604564 | 11/1970 | Germany . |
| 1136025 | 5/1987 | Japan . |
| 1276693 | 11/1989 | Japan . |
| 439910 | 12/1967 | Switzerland . |
| 1063119 | 3/1967 | United Kingdom . |

*Primary Examiner*—John Sipos
*Assistant Examiner*—Gene L. Kim
*Attorney, Agent, or Firm*—Selitto & Associates

[57] ABSTRACT

The invention relates to a sealing jaw for sealing thermoplastic materials or paper or cardboard coated with thermoplastic material, preferably packaging material. The sealing jaw is constructed from two ceramic materials, of which one is electrically insulating and the other electrically conductive: The electrically conductive ceramic material forms a continuous strand embedded in the insulating material and is, at or in the proximity of its end points, metallized so as to make good connection with an electric current source. The electrically conductive ceramic materials are treated with high pressure and heat so that they together form a pore-free, hard and abrasion-resistant body which can be applied to a steel rail.

18 Claims, 1 Drawing Sheet

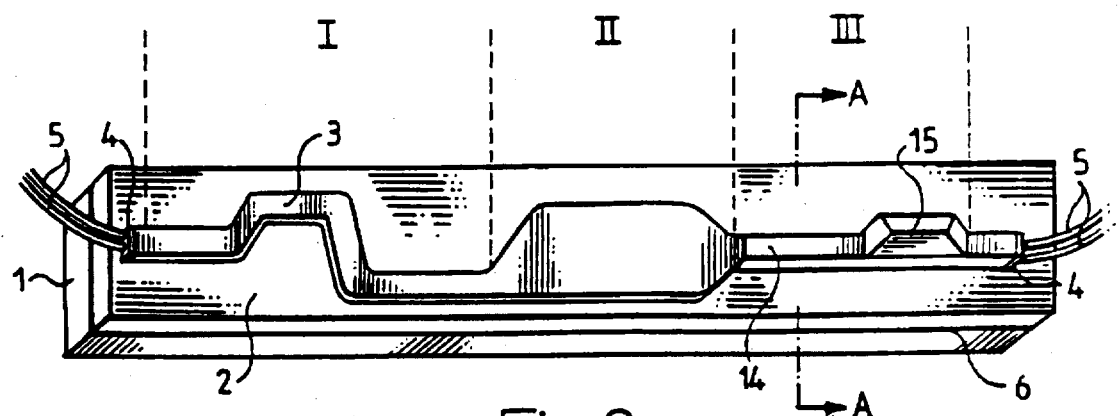
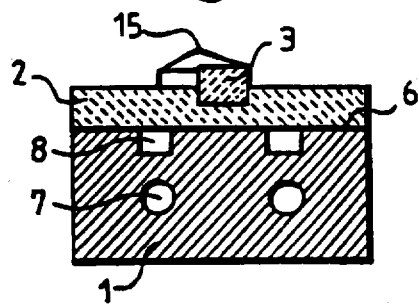
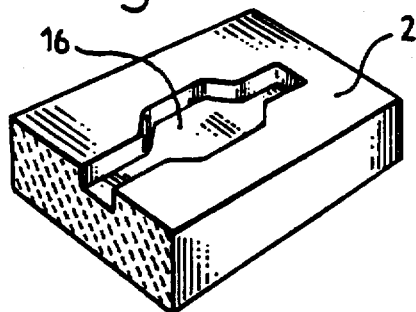
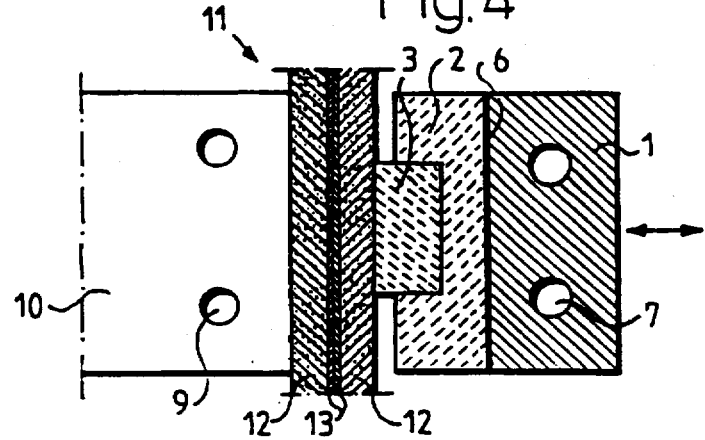

SEALING JAW CONSTRUCTED FROM TWO CERAMIC MATERIALS OF WHICH ONE IS ELECTRICALLY CONDUCTIVE

TECHNICAL FIELD

The present invention relates to an apparatus for sealing and/or joining together thermoplastic materials or materials coated with thermoplastic, preferably packaging materials, by heating and compression of the materials within the sealing zone, with a view to achieving a surface fusion of mutually applied thermoplastic layers for the purpose of obtaining a tight and mechanically durable seal.

BACKGROUND ART

It has long been known within packaging technology to produce packages of thermoplastic materials or materials coated with thermoplastic layers, for example plastic-coated paper or cardboard. The advantage inherent in these materials is that they can be joined together and sealed to one another in a convenient manner by surface fusion of mutually applied thermoplastic layers. By such means, not only is it possible to achieve the result that the packages, which have been formed by folding or other methods, can be maintained in their given shape, but it is also possible to achieve the result that the packages may be given a tight seal which protects the contents in the package and prevents it from leaking out. Seals of this type are most generally realized with the aid of so-called hot jaws which consist of devices which can accommodate between them the materials intended for sealing and compress them under the simultaneous supply of heat so that the desired parts of the compressed and mutually facing plastic layers are caused to fuse together into a tight and mechanically durable seam or joint. The commonly occurring type of such sealing jaws consists of metallic bands or strips disposed on support rails, or metal bodies which are either permanently heated or are heated on each sealing occasion by the passage of an electric current through them. Sealing may either be carried out with the aid of two heated sealing jaws which are urged towards one another on either side of the material which is to be sealed, or also by one heating jaw and a so-called counter jaw whose sole purpose is to constitute a back-up abutment for the heating jaw and cool the material in order that the sealing seam or joint may rapidly be stabilized. The most commonly occurring sealing jaws in modern, automatic packaging machines consist of heat jaws with thin metal bands or strips disposed over an insulating ceramic material provided on a steel rail. At the moment of sealing, the sealing jaws are closed with great compressive force so that between them they accommodate the material which is to be sealed, whereafter a brief current pulse is passed through the above-mentioned metallic strips which are instantaneously heated to high temperature. The heat generated in the metallic strips is transferred to the packaging material and the mutually facing thermoplastic layers are caused to fuse together. The current pulse is discontinued when sufficient quantity of heat has been generated, whereafter the sealing jaws are opened and the sealed material is released.

For production engineering and other reasons, for example those forces which act on the strips because of their elongation on heating, it is difficult, employing thin metal strips, to realize anything other than identical and straight seals. In certain cases, there is however a need to be able to work with curved sealing lines or seals of different strengths or adhesive force along the extent of the seal. It has not in principle been possible to realize this with the aid of prior art technology which utilizes metallic strips but, according to the present invention, these needs may be satisfied.

SUMMARY OF THE INVENTION

The present invention is characterized by two sealing jaws which are disposed to be movable in relation to one another, and are arranged to be capable of accommodating between them the material intended for sealing, at least the one sealing jaw displaying a ceramic part which comprises at least two ceramic materials, of which the one is electrically insulating and the other electrically conductive, and that the electrically conductive ceramic material forms one or more continuous strands embedded in the insulating material which are, at or in the proximity of their ends, connectible to an electric current source.

Thus, in the present invention, metal strips have been replaced by electrically conductive ceramic material which, among other things, enjoys the advantage that there will be considerably smaller differences in the coefficient of linear expansion between the conductive material and the subjacent insulating ceramic layer. This entails that the mechanical stresses in the ceramic insulating layer may be reduced.

BRIEF DESCRIPTION OF THE ACCOMPANYING DRAWING

One preferred embodiment of the present invention will now be described in greater detail hereinbelow, with particular reference to the accompanying schematic Drawing, in which:

FIG. 1 is a perspective view of a heat sealing jaw;

FIG. 2 shows a cross section taken along the line A—A in FIG. 1;

FIG. 3 shows a detail of the ceramic insulating material; and

FIG. 4 shows how the sealing cycle proceeds.

DESCRIPTION OF PREFERRED EMBODIMENT

The heating jaw illustrated in FIG. 1 is constructed on a rail 1 of, for example, steel or copper, to which the insulating ceramic layer 2 is applied with the aid of an adhesive 6 or with the aid of mechanical anchorage members. As an "inlay" in the insulating ceramic layer 2, there is a strand of an electrically conductive ceramic material 3. The electrically insulating material 2 may, for example, consist of a mixture of zirconium dioxide ($Z_rO_2$) and silicon carbide (SIC) and the electrically conductive ceramic material 3 of a mixture of titanium boride ($T_iB_2$) and silicon carbide (SiC). The proportion of $Z_rO_2$ in the insulating ceramic may be of the order of magnitude of between 10 and 50 percent by volume, preferably 30 percent by volume, and, in the electrically conductive ceramic, the proportion of $T_iB_2$ may be of the order of magnitude of between 20 and 60 percent by volume, preferably 45 percent by volume. The electrically conductive material 3 constitutes a continuous strand which, in this case, has been given complicated and varied configuration with the intention of facilitating the description and an understanding of the present invention. The end points of the strand 3 display metallized contact spots 4 to which electric leads 5 from a current source may be connected. As is apparent from FIG. 1, the extent of the strand 3 is divided into three zones I, II and III for facilitating an understanding of the following description.

When heat is to be generated in the sealing heat jaw according to FIG. 1, the leads 5 are connected to a current source and a current pulse is passed through the electrically conductive ceramic material 3. Since this is a matter of a single current path, the electric current through the electrically conductive ceramic material 3 will be uniform along all parts of the current path and, in other words, will be uniform within the above-mentioned zones I, II and III along the strand of ceramic electrically conductive material 3. Since the cross sectional area of the strand of electrically conductive material 3 is not uniform throughout the entire current path, the current density will vary and thereby also the heat generation.

Within zone I, the current path in the electrically conductive material 3 is, granted, irregular inasmuch as it is not straight, but the electrically conductive material 3 has the same cross sectional area within the whole of zone I, which implies that heat generation along the current path within zone I is the same per unit of length within the entire zone. On the other hand, within zone II, the strand of electrically conductive material 3 is of considerably greater width and, since it may be assumed that the thickness of the layer 3 has not been changed, the cross sectional area of the electrically conductive material 3 within zone II is considerably greater than within zone I. As is well known, the electric resistance of a material is directly proportional to the cross sectional area of the material, which implies that the electric resistance per unit of length in the electrically conductive material within zone II is less than the corresponding electric resistance within zone I. Since the heat generation which is obtained when a current is passed through a resistance is $R \times I^2$, where R is the resistance and I is the current strength, it will readily be perceived that the heat generation per unit of length in zone II will be less, since R (i.e. the resistance) is less than in zone I. Apart from the fact that the generated heat is less in zone II, the contact surface of the electrically conductive material 3 in the strand within zone II is considerably greater per unit of length than within zone I, which implies that that heat which is generated within zone II is, on the one hand, less per unit of length and, on the other hand, is dissipated over a greater surface. This entails that a surface expansion of the type which is shown within zone II may be employed in the sealing jaw within areas where no or slight sealing force and heat generation are desired. In zone I, sufficient heat is generated to achieve a surface fusion of sealed material along the configuration which has been imparted to the electrically conductive material 3, since sufficient quantity of heat within a relatively narrow zone has been generated. As has been mentioned previously, not as much heat is generated within zone II, and that heat which is generated is, moreover, dissipated over a wider surface area, which entails poorer sealing. Correspondingly, it is possible, by local reduction of the area of the current path, to obtain a local heat concentration in those cases where such is desirable.

Within zone III, it is indicated how it is not only possible to vary the width of the sealing pattern and the appearance of the current path 3, but also within the portion 14 in zone III, the current path is raised a few tenths of a millimeter. This implies that, within this region, there will be achieved a locally higher mechanical force when the sealing jaws are urged against the material which is to be sealed, and this also contributes in obtaining a more powerful seal. The portion 15 of the current path has been shaped into an edge with whose aid it is, for instance, possible to carry out direct cutting operations, perforations, or desired mechanical processing of the packaging material (for example realizing incisions, holes, slots, etc.), at the same time as the sealing operation is carried out.

It is thus possible, with the sealing jaw illustrated in FIG. 1, not only to realize sealing lines of optional extent, but also to realize disruptions in the sealing line, local strengthening of the seal and even to realize slots, perforations and the execution of other mechanical processing at the same time as the sealing operation is put into effect. By raising, on either side of the conductive material, the electrically insulating ceramic to a level flush with the conductive material, cold pressure zones can also be obtained in the proximity of the sealing region which can thereby prevent the lateral expansion of the seal. Because of the extremely high abrasion resistance and hardness of the ceramic materials, the shape which has been imparted to the material on manufacture is not blunted or altered.

FIG. 2 shows a cross section of FIG. 1 taken along the line A—A. As will be apparent from FIG. 2, the steel rail 1 is provided with drilled cooling ducts 7 or with open channels 8 which connect directly to the surface of the ceramic insulating material. As is apparent from FIG. 2, the ceramic insulating material 2 is directly connected, by means of an adhesive layer 6, to the steel rail I and the electrically conductive material 3 is inlaid into the insulating ceramic material 2. Since the ceramic materials 2 and 3 are substantially of the same coefficient of linear expansion, no appreciable stresses will occur between the ceramic electrically insulating layer 2 and the electrically conductive material layer 3. Granted, the conductive layer 3 will be heated considerably more than the insulating layer 2, but an efficient cooling with the aid of the cooling ducts and channels 7 and 8 entails that the problem inherent in mechanical stresses in the material can be controlled.

The working method for the heat sealing jaw according to FIG. 1 is schematically illustrated in FIG. 4 in which the material 11 intended for sealing (and consisting of a packaging material with a paper layer 12 and plastic coatings 13) has been inserted between one heat sealing jaw and one so-called counter jaw 10. The heat sealing jaw and the counter jaw are urged towards one another while accommodating and compressing the packaging material 11 between them. In connection with this compression, a current is passed through the electrically conductive material layer 3 which is instantaneously heated, whereafter the heat is transferred by conduction to the plastic layers 13 of the packaging material 11 which is caused to melt and, under the prevailing pressure, to fuse and unite with one another. In order rapidly to be able to stabilise the thus achieved seam or joint, i.e. to cause the plastic material once again to be cooled, the counter jaw 10 is, in the illustrated embodiment, provided with cooling channels 9. After completed sealing operation, the sealing jaws are separated, whereafter the sealed or joined packaging material 11 can be removed.

By way of introduction, the manner of manufacture of a heat sealing jaw in accordance with the present invention was touched upon lightly and will be explained in greater detail below.

The manner of manufacture is based on the concept that the ceramic material may be produced in two steps. In a first step, a body of the insulating material 2 is produced by pressing of a ceramic powder, and one such body is schematically illustrated in FIG. 3. A channel or incision 16 corresponding to the form of the desired pattern of extent of the electrically conductive ceramic 3 is also impressed or shaped in the body 2. The cavity or channel 16 is thereafter filled with ceramic, electrically conductive powder material, the strand 3 being thus formed.

That material of which the body 2 consists comprises a powder which is pressed to a configuration suitable for the purpose, possibly with some form of retroprocessing. The material in the strand 3 may consist of a powder which is pressed into the cavity 16, or alternatively mixed into a slurry which is coated over the body 2.

This pressed ceramic body does not, however, possess any mechanical strength of note, for which reason it must be handled with a certain degree of care. The formed ceramic body or, more precisely, the combination of different ceramic materials with different electric properties, is placed in a pressure chamber. In this pressure chamber (entitled the Quintus Press by the manufacturers ABB), the pressure is raised to approx. 160 MPa and the temperature to 1750° C. After the ceramic materials have been subjected to heat and high pressure for approx. 4 hours, they have sintered together to form an extremely fine-pored, hard and abrasion resistant body which, in a manner mentioned above such as, for example, by soldering or gluing, is secured to the cooling body or alternatively is mechanically clamped in place.

It has proved that, using the new technology employing ceramic electrically conductive material, considerable freedom is afforded in selecting the appearance, extent, local strength, etc., of seals and it has moreover proved that the ceramic heat sealing jaws possess excellent abrasion resistance, for which reason they are not worn out to any appreciable degree. It is naturally possible, without departing from the spirit and scope of the inventive concept as herein disclosed, to realize completely different sealing configurations and practical applications than those presented here, and it is also possible to employ other ceramic materials than those disclosed, even though it has been found that these particular ceramics which have been mentioned here are the most expedient of those ceramic materials or ceramics known to us. It is often of importance to maintain extreme precision and accuracy in the design and construction of a sealing jaw, and it may, therefore be necessary, after production of the sealing jaw according to those methods accounted for in the foregoing, to grind the electrically conductive strand 3 in order, on the one hand, to obtain an improved surface smoothness, and, on the other hand, a greater degree of dimensional precision. It may also prove necessary and appropriate, in the production of the sealing jaw, first to produce and pressure treat the electrically insulating material 2 for realizing a body in accordance with that illustrated in FIG. 3. Thereafter, the channels 16 in the body 2 may be filled with electrically conductive ceramic material 3, whereupon the entire body is once again subjected to pressure and heat treatment so that the ceramic material 3 also sinters together to form a hard and abrasion resistant part. A simultaneous pressure treatment and sintering of the two ceramics is, however, to be preferred and this gives the best union strength between the electrically conductive and the electrically insulating ceramics.

The present invention should not be considered as restricted to that described above and shown on the Drawing, many modifications being conceivable without departing from the spirit and scope of the appended claims.

What is claimed is:

1. A method for making a sealing jaw adapted to seal thermoplastic materials, said sealing jaw having an electrically insulating ceramic layer a heating element, which is imbedded in said insulating layer, first connecting means, which is located in proximity to one end of said heating element, and second connecting means, which is located in proximity to an opposite end of said heating element, said first and second connecting means connecting said heating element to a source of electric current, and said heating element being made from an electrically conductive ceramic material and cooperating with said first and second connecting means to form an electric current conducting pathway, whereby electric current flowing through said heating element causes the direct heating of said heating element, said method comprising the steps of forming ceramic powders into bodies of desired configuration for said insulating layer and said heating element; uniting said bodies with one another into a combined body; heating said combined body to a range between 1600° C. and 1900° C. under a pressure exceeding 100 MPa for at least 120 minutes, whereby the ceramic powders are sintered together to form an integral, dense and pore-free structure which is extremely hard and abrasion-resistant.

2. The method of claim 1, further comprising the steps of applying said bodies in layers above one another and processing said structure by grinding same to desired dimensions.

3. Apparatus adapted for use in producing packages which are formed from a tube produced from a planar web of packaging material, the tube being, after filling with the intended contents, divided up into packaging containers by repeated sealings transversely of the longitudinal direction of the tube, said apparatus comprising a sealing jaw having an electrically insulating ceramic layer a heating element, which is imbedded in said insulating layer such that at least a portion of said heating element is inlaid in said insulating layer, said at least a portion of said heating element and said insulating layer being sintered together so as to form an integral, fine-pored, hard and abrasion-resistant body; first connecting means, which is located in proximity to one end of said heating element; and second connecting means, which is located in proximity to an opposite end of said heating element, said first and second connecting means connecting said heating element to a source of electric current, and said heating element being made from an electrically conductive ceramic material and cooperating with said first and second connecting means to form an electric current conducting pathway, whereby electric current flowing through said heating element causes the direct heating of said heating element.

4. A sealing jaw for sealing thermoplastic materials, comprising an electrically insulating ceramic layer; a heating element imbedded in said insulating layer such that at least a portion of said heating element is inlaid in said insulating layer, said at least a portion of said heating element and said insulating layer being sintered together so as to form an integral, fine-pored, hard and abrasion-resistant body; first connecting means located in proximity to one end of said heating element; and second connecting means located in proximity to an opposite end of said heating element, said first and second connecting means connecting said heating element to a source of electric current, and said heating element being made from an electrically conductive ceramic material and cooperating with said first and second connecting means to form an electric current conducting pathway, whereby electric current flowing through said heating element causes the direct heating of said heating element.

5. The sealing jaw of claim 4, wherein said heating element includes another portion extending above a surface of said insulating layer.

6. The sealing jaw of claim 5, wherein said insulating layer includes a channel formed in said surface thereof and wherein said at least a portion of said heating element has a shape complementary to the shape of said channel.

7. The sealing jaw of claim 6, further comprising a metal rail, said insulating layer being fixedly attached to said rail.

8. The sealing jaw of claim 6, wherein said rail includes a plurality of cooling ducts formed therein.

9. The sealing jaw of claim 6, wherein said surface of said insulating layer includes elevated areas which are flush with said heating element for providing cold pressure zones, which function to inhibit lateral expansion of a seal in thermoplastic materials during the performance of a sealing operation by said sealing jaw.

10. The sealing jaw of claim 6, wherein the coefficient of linear expansion of said insulating layer is substantially similar to the coefficient of linear expansion of said heating element.

11. The sealing jaw of claim 4, wherein said heating element includes first and second portions having first and second heights, respectively, said first height being greater than said second height, whereby said first portion exerts greater mechanical sealing forces upon thermoplastic materials than said second portion during the performance of a sealing operation by said sealing jaw.

12. The sealing jaw of claim 11, wherein said first portion of said heating element has an edge at a surface thereof opposite said insulating layer for performing a mechanical operation during the performance of a sealing operation by said sealing jaw.

13. The sealing jaw of claim 12, wherein said mechanical operation includes a cutting operation.

14. The sealing jaw of claim 12, wherein said mechanical operation includes an operation for forming at least one perforation in thermoplastic materials.

15. The sealing jaw of claim 12, wherein said mechanical operation includes an operation for forming at least one incision in thermoplastic materials.

16. The sealing jaw of claim 4, wherein said heating element includes a portion extending longitudinally along said insulating layer in a non-linear fashion for providing a non-linear sealing line in thermoplastic materials.

17. The sealing jaw of claim 4, wherein said heating element includes first and second portions having first and second cross-sectional areas, respectively, transverse to the longitudinal axis of said heating element, said first cross-sectional area being larger than said second cross-sectional area, whereby said first portion generates less heat than said second portion when electric current flows through said heating element.

18. The sealing jaw of claim 4, wherein said insulating layer is formed from a mixture of zirconium dioxide ($ZrO_2$) and silicon carbide (SiC), the quantity of zirconium dioxide constituting between 10 and 50 percent by volume, and wherein said heating element is formed from a mixture of titanium boride ($TiB_2$) and silicon carbide (SiC), the quantity of titanium boride constituting between 20 and 60 percent by volume.

* * * * *

UNITED STATES PATENT AND TRADEMARK OFFICE
CERTIFICATE OF CORRECTION

PATENT NO. : 5,682,732
DATED : November 4, 1997
INVENTOR(S) : Hans Selberg

It is certified that error appears in the above-identified patent and that said Letters Patent is hereby corrected as shown below:

Column 2, line 47, delete "$Z_rO_2$" and insert --$ZrO_2$--.
Column 2, line 48, delete "SIC" and insert --SiC--.
Column 2, line 49, delete "($T_iB_2$)" and insert --$TiB_2$--.
Column 2, line 50, delete "$Z_rO_2$" and insert --$ZrO_2$--.
Column 2, line 53, delete "($T_iB_2$) and insert --($TiB_2$)--.
Column 3, line 28, delete "$Rxl^2$" and insert --R x $I^2$--.
Column 4, line 19, delete "steel rail I" and insert --steel rail 1--.

In the Claims

Column 5, line 59, after "layer" insert --,--.
Column 6, line 22, after "layer" insert --;--.

In the Abstract On the title page, item [57],

Line 5-6, after "conductive" delete ":" and insert --.--.

Signed and Sealed this

Twenty-ninth Day of June, 1999

Attest:

Attesting Officer

Q. TODD DICKINSON

Acting Commissioner of Patents and Trademarks